(12) United States Patent
Baptiste et al.

(10) Patent No.: US 9,712,346 B2
(45) Date of Patent: Jul. 18, 2017

(54) CONTINUOUS PHASE MODULATION METHOD AND EMITTER IMPLEMENTING SAID METHOD

(71) Applicant: THALES, Courbevoie (FR)

(72) Inventors: François Baptiste, Gennevilliers (FR);
Adrien Le Naour, Gennevilliers (FR);
Alban Denicourt, Gennevilliers (FR);
Célien Vincent, Gennevilliers (FR);
Valentin Felix, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/789,731

(22) Filed: Jul. 1, 2015

(65) Prior Publication Data
US 2016/0006585 A1 Jan. 7, 2016

(30) Foreign Application Priority Data

Jul. 4, 2014 (FR) ...................... 14 01507

(51) Int. Cl.
| | |
|---|---|
| *H04L 25/03* | (2006.01) |
| *H04L 27/20* | (2006.01) |
| *H04B 1/10* | (2006.01) |
| *H04L 27/22* | (2006.01) |

(52) U.S. Cl.
CPC ..... *H04L 25/03057* (2013.01); *H04B 1/1027* (2013.01); *H04L 25/03343* (2013.01); *H04L 27/2017* (2013.01); *H04L 27/22* (2013.01); *H04L 2025/03407* (2013.01)

(58) Field of Classification Search
CPC ... H04L 27/0008; H04L 27/12; H04L 27/122; H04L 27/04; H04L 27/2014; H04L 27/2092; H04L 27/2071; H04L 25/03834; H03C 3/40; H03C 3/14
USPC .................................................. 375/302–308
See application file for complete search history.

(56) References Cited

U.S. PATENT DOCUMENTS

| | | | |
|---|---|---|---|
| 2005/0089113 A1 | 4/2005 | Seidl | |
| 2008/0025431 A1* | 1/2008 | Horikawa | ............... H04L 27/00 375/295 |
| 2009/0003492 A1 | 1/2009 | Fitch et al. | |

(Continued)

FOREIGN PATENT DOCUMENTS

FR 2 938 988 A1 5/2010

*Primary Examiner* — Janice Tieu
(74) *Attorney, Agent, or Firm* — Baker Hostetler LLP

(57) ABSTRACT

A continuous phase modulation method comprises the following steps: receiving a sequence of digital data symbols a(n) to be emitted; transforming the sequence of symbols a(n) to be emitted into a transformed sequence of symbols b(n), each symbol b(n) of which is equal to the sum of a symbol a(n) to be emitted and of a corrective factor equal to a transformation Tf applied to a plurality of differences (a(n)-a(n−1)) between two consecutive symbols to be emitted, the transformation Tf applied being a combination c of at least two differences between two consecutive symbols of the sequence to be emitted, transformed by the application of a non-linear function f; filtering the sequence of transformed symbols b(n) with a shaping filter and modulating the filtered sequence with a phase modulator; said transformation Tf being defined so as to minimize interference between modulated symbols filtered by a receiving filter.

12 Claims, 4 Drawing Sheets

(56) References Cited

U.S. PATENT DOCUMENTS

2010/0220770 A1* 9/2010 Oka .................. H03F 1/32
375/219

* cited by examiner

CONTINUOUS PHASE MODULATION METHOD AND EMITTER IMPLEMENTING SAID METHOD

CROSS-REFERENCE TO RELATED APPLICATION

This application claims priority to foreign French patent application No. FR 1401507, filed on Jul. 4, 2014, the disclosure of which is incorporated by reference in its entirety.

FIELD OF THE INVENTION

The invention relates to the field of digital communication systems and more particularly to emitters of digital data using, to shape the digital signal to be transmitted, a continuous phase modulation.

BACKGROUND

In a digital communication system, it is preferable to use constant amplitude modulations, for example continuous phase modulations, because the latter allow the range of the transmitted signal to be maximized. Specifically, constant envelope modulations have the advantage of allowing the emitted signal to have an almost constant power. The continuity of the phase allows the signal to occupy a narrower bandwidth, and the constant envelope of the signal allows nonlinearities in the transmission channel to be better withstood and the amplifiers of the system to function closer to their saturation point.

Thus, to decrease constraints on the spectral width of the transmitted signal, notably its occupied frequency bandwidth, and the disruption potentially caused to adjacent channels, it is known to use continuous phase modulation methods such as Gaussian minimum shift keying (GMSK) modulation.

Continuous phase modulations, although effective, have the drawback of introducing substantial interference between symbols in the received signal. The symbol received at the instant t is distorted at least by its neighbors emitted at the instants t−1 and t+1, thereby making the decision that a receiver must make to determine the initial state of said symbol more difficult. For example, in the case of a binary modulation, a symbol may take eight different states. The receiver will therefore have to make a decision among these eight possibilities in order to determine the corresponding bit. Receiver complexity and the disruption caused by interference between symbols increases as the number of possible symbol states increases. In addition, prior-art methods for demodulating transmitted continuous phase modulated signals have the drawback of being complex because they often use an equalizer and a maximum likelihood sequence estimator (MLSE) implemented, for example, via a Viterbi algorithm.

The French patent application of the Applicant, published under the number FR 2 938 988, describes a continuous phase modulation method that allows interference between symbols on reception to be decreased.

The method described in this application is based on implementation on emission of a linear combination of these symbols to be emitted before they are filtered.

Although the aforementioned method improves the level of inter-symbol interference relative to a conventional continuous phase modulation, it does not allow this effect to be completely suppressed.

There is therefore a need for an improved continuous phase modulation method that allows inter-symbol interference to be almost completely prevented.

SUMMARY OF THE INVENTION

One objective of the present invention is to provide a continuous phase modulation method that allows any interference between symbols on reception of the signal to be almost completely suppressed.

Thus one subject of the invention is a continuous phase modulation method comprising the following steps:
 receiving a sequence of digital data symbols a(n) to be emitted;
 transforming the sequence of symbols a(n) to be emitted into a transformed sequence of symbols b(n), each symbol b(n) of which is equal to the sum of a symbol a(n) to be emitted and of a corrective factor equal to a transformation Tf applied to a plurality of differences (a(n)-a(n−1)) between two consecutive symbols to be emitted, the transformation Tf applied being a combination c of at least two differences between two consecutive symbols of the sequence to be emitted, transformed by the application of a non-linear function f;
 filtering the sequence of transformed symbols b(n) with a shaping filter; and
 modulating the sequence of filtered symbols with a phase modulator in order to obtain a sequence of modulated symbols,
 said transformation Tf being defined so as to minimize interference between modulated symbols filtered by a receiving filter.

According to one particular aspect of the invention, said transformation Tf is defined by applying the following iterative steps:
 generating a sequence of digital data symbols a(n), referred to as the test sequence;
 filtering the test sequence with a shaping filter;
 modulating the sequence of filtered symbols;
 filtering the sequence of modulated symbols with a receiving filter;
 demodulating the sequence of filtered symbols on reception;
 modifying the value of each symbol a(n) of the test sequence by a preset value so as to obtain a transformed test symbol b(n);
 stopping the iterative process when the error between each demodulated symbol and the corresponding symbol in the test sequence has converged to a minimum value; and
 identifying the combination c and the non-linear function f of the transformation Tf as those that allow the transformed test sequence to be substantially identical to the test sequence generated then transformed by applying said transformation Tf.

According to one particular aspect of the invention, said iterative steps furthermore comprise a step of determining the error between each demodulated symbol and the corresponding symbol in the sequence to be emitted, the value of each symbol a(n) of the test sequence being corrected by a value dependent on said error.

According to one particular aspect of the invention, said iterative steps are executed for a plurality of different test sequences and the combination c and the non-linear function f are identified using a plurality of test sequence and transformed test sequence pairs.

According to one particular aspect of the invention, the combination c and the non-linear function f of the transformation Tf are identified by applying the following successive steps:
limiting the combination c to two coefficients of equal value;
determining the non-linear function f and the combination c to be applied so that the transformed test sequence is substantially identical to the test sequence generated then transformed by applying said transformation Tf;
setting the non-linear function f and extending the number of coefficients of the combination c; and
determining the combination c to be applied so that the transformed test sequence is substantially identical to the test sequence generated then transformed by applying said transformation Tf.

According to one particular aspect of the invention, the combination c and the non-linear function f of the transformation Tf are identified using a numerical solution method of the Monte-Carlo type.

According to one particular aspect of the invention, the non-linear function f is chosen to be an odd function.

According to one particular aspect of the invention, the possible values of the transformed symbols b(n) are calculated beforehand from possible values of the symbols a(n) to be emitted and from the definition of the combination c and of the non-linear function f.

According to one particular aspect of the invention, the symbols a(n) to be emitted are taken from a constellation comprising a plurality of states.

Another subject of the invention is a method for generating a mathematical transformation Tf intended to be used in a continuous phase modulation method according to the invention, said method for generating a transformation comprising the following iterative steps:
generating a sequence of digital data symbols a(n), referred to as the test sequence;
filtering the test sequence with a shaping filter;
modulating the sequence of filtered symbols;
filtering the sequence of modulated symbols with a receiving filter;
demodulating the sequence of filtered symbols on reception;
modifying the value of each symbol a(n) of the test sequence by a preset value so as to obtain a transformed test symbol b(n);
stopping the iterative process when the error between each demodulated symbol and the corresponding symbol in the test sequence has converged to a minimum value; and
identifying the combination c and the non-linear function f of the transformation Tf as those that allow the transformed test sequence to be substantially identical to the test sequence generated then transformed by applying said transformation Tf.

Another subject of the invention is an emitter intended to emit a continuous phase modulated signal, comprising:
means for receiving a sequence of digital data symbols a(n) to be emitted;
computational means configured to transform the sequence of symbols a(n) to be emitted into a transformed sequence of symbols b(n), each symbol b(n) of which is equal to the sum of a symbol a(n) to be emitted and a corrective factor equal to a transformation Tf applied to a plurality of differences (a(n)-a(n−1)) between two consecutive symbols to be emitted, the transformation Tf applied being a combination c of at least two differences between two consecutive symbols of the sequence to be emitted, transformed by applying a non-linear function f;
a shaping filter for filtering the sequence of transformed symbols b(n); and
a phase modulator for modulating the sequence of filtered symbols,
said transformation Tf being defined so as to minimize interference between the modulated symbols filtered by a receiving filter.

BRIEF DESCRIPTION OF THE DRAWINGS

Other features and advantages of the present invention will become more clearly apparent on reading the following description given with regard to the appended drawings, which show.

DETAILED DESCRIPTION

Continuous phase modulations (CPMs) are a family of modulations widely used to transmit digital data notably in the context of wireless communications. In contrast to other modulation methods in which the phase of the modulated signal is subject to abrupt transitions, CPM modulations allow the phase of the transmitted symbols to be continuously modulated.

CPM modulation of a sequence of binary data conventionally comprises the following steps:
The binary data to be transmitted are first transformed into symbols a(n) via a mapping. This step allows one or more bits to be associated with a symbol to be transmitted. The symbols obtained may be characterized by the representation in the complex plane of their constellation. If the symbol a(n) conveys an information bit, its constellation will comprise two states; if it conveys two information bits, its constellation will comprise four states; and, generally, if said symbol conveys n information bits its constellation will comprise $2^n$ states. The points of the constellation are, for example, evenly distributed on the unity circle. The symbols a(n) are transmitted via a series of Dirac pulses spaced apart from each other by a duration equal to T, where T is the duration of a symbol. The Dirac pulse at the instant is represented by the term a(n)δ(t−nT). The series of Dirac pulses is then filtered by an impulse response filter defined by the function h(t), then transmitted to a phase modulator. The pulse h(t) is defined over a duration LT, where L is generally an integer higher than or equal to 1. The values of this pulse are zero outside of the interval [0, LT] and its integral between 0 and LT equals 1. The phase modulator delivers as output a signal S(t) that may be represented by the following formula, where h is the index of the modulation:

$$S(t) = \cos\left(2\pi F_0 t + 2\pi h \sum_{n=-\infty}^{+\infty} a(n)\delta(t-nT) * h(t)\right) \quad (1)$$

In order to combat the interference between symbols inherent to this type of modulation schema, the invention consists in replacing the symbols a(n) with symbols b(n) transformed by a particular mathematical function.

Figure 1:
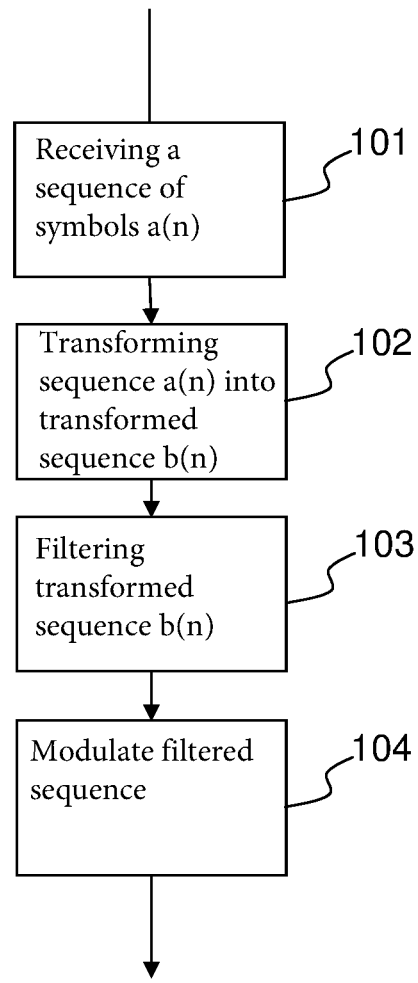
FIG. 1, a flowchart schematically showing the steps of the continuous phase modulation method according to the invention.

The method according to the invention is described in FIG. 1. In a first step 101, a set of symbols a(n) to be emitted is received. As indicated above, the symbols a(n) may convey a plurality of information bits and belong to a set of symbols from a preset constellation. For example, in the case of an eight-state modulation, the symbols a(n) may take eight separate values. The information symbols a(n) correspond to phase transitions between two modulated symbols.

In a second step 102, the symbols a(n) are transformed into symbols b(n) by way of a transformation operation Tf described below. Each symbol b(n) is obtained by applying the transformation Tf to a plurality of consecutive symbols a(n). To carry out step 102, one possible solution consists in memorizing, in a delay line comprising K cells, K consecutive symbols a(n), ... a(n−K) to be emitted. The transformed symbol b(n) is obtained by applying the transformed $T_f$ to the K memorized symbols a(n), ... a(n−K). Next, in order to generate the following transformed symbol b(n+1), a new symbol a(n+1) is inserted into the delay line by shifting by one cell the symbols a(n) ... a(n−K+1). The delay line is used as a shift register.

The transformed symbol b(n) obtained for the instant n (in discrete time) is obtained using the following relationship:

$$b(n) = a(n) + \sum_{j=-p}^{p} c(j) \cdot f(a(n-j) - a(n-j+1)) \quad (2)$$

K=2(p+1) is the number of buffered symbols a(n);
c( ) is a linear combination, for example a finite impulse response filter; and
f( ) is a non-linear function that takes as input the difference between two consecutive symbols (a(n−j)-a(n−j+1)) and returns as output a value modified by a non-linear operation.

Without departing from the scope of the invention, the expression given by the relationship (2) may also be written in the following form, where p and p' are two different positive integers:

$$b(n) = a(n) + \sum_{j=-p}^{p'} c(j) \cdot f(a(n-j) - a(n-j+1))$$

The introduction of a non-linear function associated with the linear combination of a plurality of symbols makes it possible to effectively combat interference between symbols on reception by limiting the spectral width of the modulated signal while nonetheless guaranteeing a good demodulation performance.

Specifically, in order to effectively combat the effect of interference between symbols, the compensation to be applied to each symbol to be emitted depends on the actual value of the symbol. Thus, a purely linear transformation does not allow interference between symbols to be integrally corrected.

Since the digital receiving filter is a low-pass (baseband) filter, it attenuates non-linearly the phase displacements of the symbols depending on their size. This effect causes interference between symbols and therefore requires, on emission, a correction to be applied to the symbols a(n) to be emitted depending on the difference between the symbols (a(n−j)-a(n−j+1)).

In a third step 103, the transformed symbols b(n) are filtered by a shaping filter h(t) then, in a fourth step 104, are modulated by a phase modulator or a frequency modulator in order to generate a continuous phase modulated signal.

A method for determining numerically the coefficients of the linear combination c( ) and the values of the non-linear function f( ) from the values that differences between two consecutive symbols (a(n)-a(n−1)) are able to take, depending on the constellation to which the symbols a(n) belong, will now be described.

The method consists in measuring, using one or more preset sequences of symbols a(n), for example sequences generated randomly, the difference, on reception, between the demodulated symbols and the symbols emitted and in adjusting, iteratively, the values of the symbols b(n) of the transformed sequence so as to obtain, on reception, demodulated symbols that display almost zero inter-symbol interference. The emission and reception shaping filters are taken into account when generating the demodulated symbols. Without departing from the scope of the invention, it is possible to take into account the impact of radio filters or amplifiers or any other element of the transmission chain introducing nonlinearities.

Figure 2:
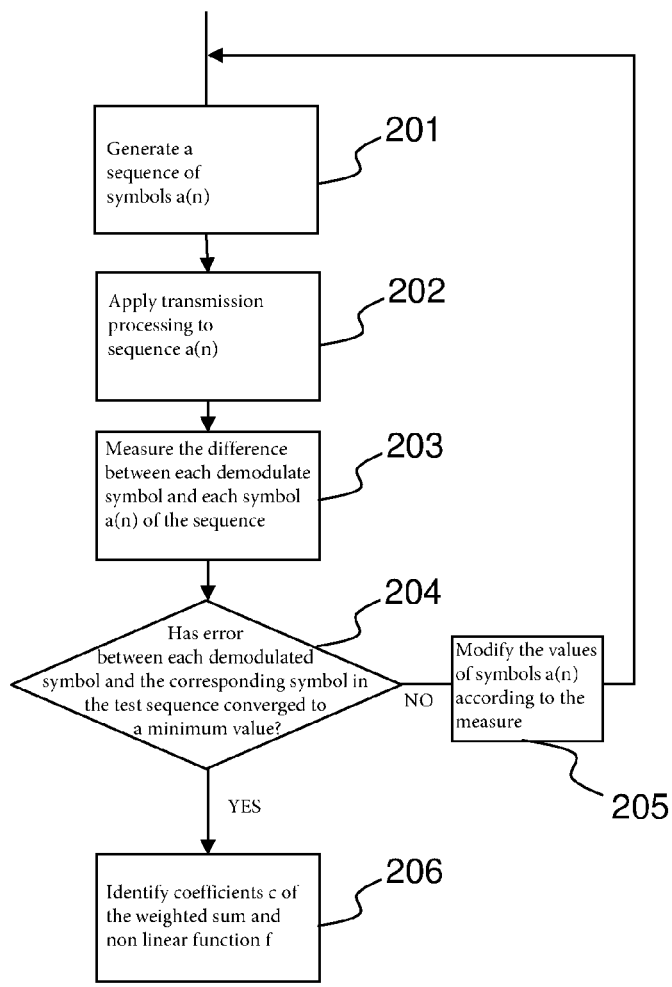
FIG. 2, a flowchart schematically showing the steps of the method, according to the invention, allowing the transformation function to be applied to the symbols to be emitted to be defined.

FIG. 2 describes steps allowing, for a sequence of given symbols a(n), the optimal sequence of transformed symbols b(n) that allows inter-symbol interference to be suppressed on reception to be generated.

In a first step 201, a sequence of digital data symbols a(n) is generated the values of which belong to the set of possible values of the constellation associated with the chosen modulation.

Next, in a second step 202, all of the processing operations of the transmission chain—in other words the filtering with the shaping filter, the phase modulation then the filtering with the suitable receiving filter and the demodulation of the symbols—are applied to the generated sequence.

Next, in a third step 203, the difference between each demodulated symbol and the corresponding emitted symbol in the sequence is measured.

A step of modifying 205 the values of the symbols a(n) of the initially generated sequence is then carried out. The correction applied may depend on the measured difference between demodulated and emitted symbols. For example, the correction applied may be equal to this difference. The steps 201, 202, 203, 205 are iterated until the following test 204 is passed. The test 204 consists in verifying whether the difference between demodulated symbols and emitted symbols is substantially zero or lower than a preset threshold.

When this test 204 is passed, the sequence of modified symbols, which corresponds to the transformed sequence b(n), is retained and it is then sought to numerically identify the transformation function Tf in the form given in relationship (2).

Of course, the method described in FIG. 2 is reproduced with a plurality of different generated sequences so as to be able to best approximate numerically the parameters of the transformation Tf.

To determine the precise parameters of the transformation Tf, it is possible to use a numerical solution method of the Monte Carlo type.

One possible method consists in initially limiting the combination c( ) to a symmetric filter having 2 identical coefficients and in determining the values of the non-linear function f( ) from the values that the inter-symbol differences a(n)-a(n-1) are able to take.

Once the non-linear function f( ) has been defined, the number of coefficients of the combination c( ) may be extended and these coefficients determined by identification. Advantageously, the combination c( ) is a symmetric finite impulse response filter.

The precision obtained for the parameters of the transformation Tf notably depends on the number of states of the constellation of the symbols a(n).

According to one particular variant embodiment, the non-linear function f( ) is chosen to be an odd function. By using an odd function, symbols a(n) of the same absolute value are transformed into symbols b(n) of the same absolute value.

Without departing from the scope of the invention, any numerical identification method allowing the parameters of a transformation model Tf given by the relationship (2) to be identified from a plurality of pairs comprising a sequence of symbols a(n) and a corresponding sequence of symbols b(n) assumed transformed by applying the transformation Tf, is envisionable by a person skilled in the art.

Figure 3:
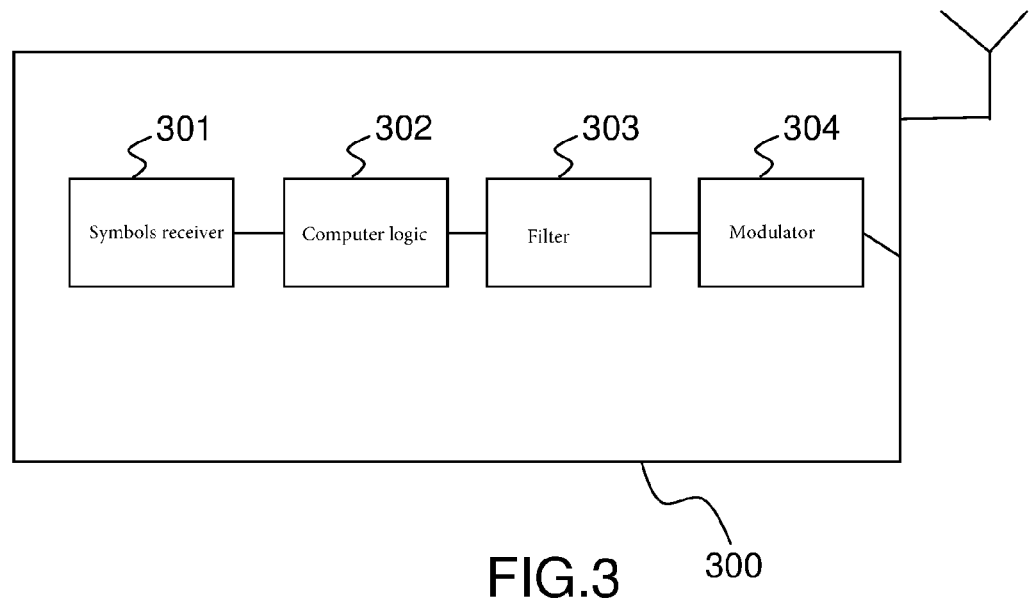
FIG. 3, a diagram of an emitter comprising means suitable for implementing the invention.

FIG. 3 is a diagram of an emitter comprising means suitable for implementing the invention.

The emitter 300 is a wireless emitter that may be employed in a wireless communication system, for example a radio-frequency or cellular system.

The emitter 300 comprises means 301 for receiving a sequence of symbols a(n) to be emitted. These symbols are issued from information bits that have been converted into symbols according to the constellation of the modulation chosen. The means 301 may, for example, take the form of a piece of application software and/or a specific or generic processor.

Computational means 302 are configured to transform the sequence of symbols a(n) to be emitted into a transformed sequence b(n) by applying the transformation function Tf, which is calculated beforehand. The computational means 302 may for example implement a processor and a memory in which the values of the transformation Tf are tabulated. The processor may be a generic processor, a specific processor, an application-specific integrated circuit (ASIC) or a field-programmable gate array (FPGA).

The emitter 300 also comprises a shaping filter 303 and a phase modulator 304 that produces as output modulated symbols that are then converted analogously and shaped by filtering and amplification with a view to the transmission of the signal over a radio channel.

Figure 4:
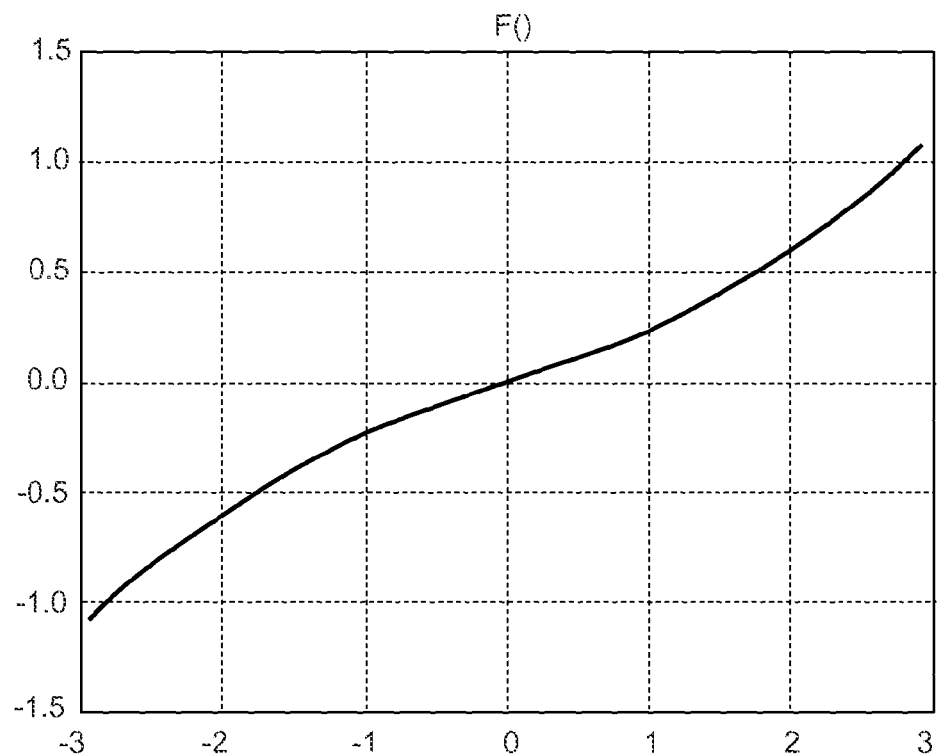
FIG. 4, an illustration of the non-linear function f( ) obtained for a continuous phase modulation of particular parameters.
Figure 5:
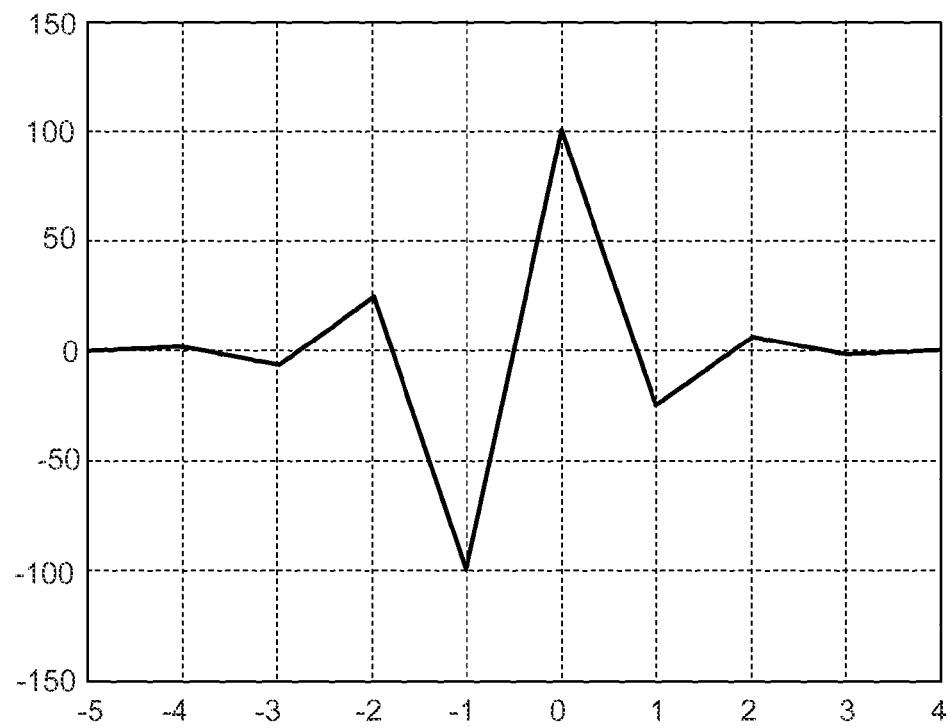
FIG. 5, an illustration of the linear combination function c( ) obtained for a modulation of the same parameters as in FIG. 4.
Figure 6:
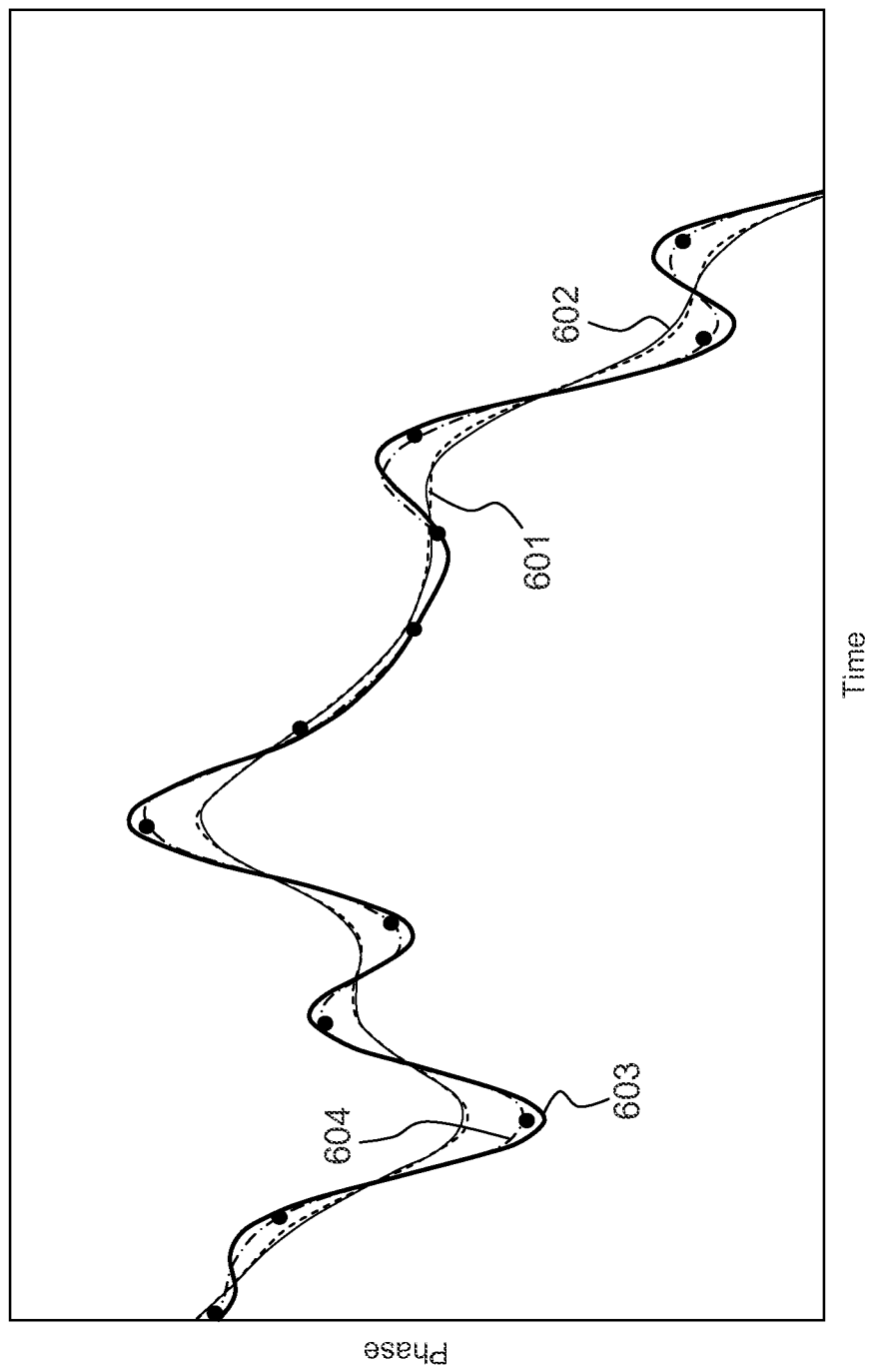
FIG. 6, an illustration of the variation in the phase of symbols over time, on emission and on reception, with and without application of the invention.

FIGS. 4, 5 and 6 illustrate the results obtained by applying the invention for a particular nonlimiting example of a continuous phase modulation using symbols conveying 4 bits per symbol, or in other words belonging to a 16-state constellation. The shaping pulse h(t) employed is a Gaussian pulse of standard deviation equal to 0.45 times the duration of a symbol. The storage of the modulation is of length L equal to 8 times the duration of a symbol.

FIG. 4 illustrates the non-linear function f( ) obtained on a graph the x-axis of which corresponds to the values of the differences between symbols of the 16-state constellation, the measured differences being limited to equivalent phase differences of between $-\pi$ and $\pi$.

FIG. 5 illustrates the linear combination c( ) obtained, which comprises 10 coefficients.

FIG. 6 shows the variation in phase over time for an emitted sequence of symbols represented by circles in FIG. 6. The curves 601 and 602 respectively show the phase of the modulated signal on emission and on reception (i.e. after suitable filtering on reception) in the case where the invention is not implemented, or in other words when a conventional continuous phase modulator is applied without transformation of the symbols to be emitted.

The curves 603 and 604 respectively show the phase of the modulated signal on emission and on reception in the case where the invention is implemented. As may be seen, the phase of the signal on reception 604 is identical or similar to that of the emitted symbols when the invention is used. When the invention is not used, the interference between symbols is substantial, this causing the phase of the received symbols and that of the emitted symbols to differ.

The invention claimed is:

1. A continuous phase modulation method comprising the following steps:
    receiving a sequence of digital data symbols a(n) to be emitted;
    transforming the sequence of symbols a(n) to be emitted into a transformed sequence of symbols b(n), each symbol b(n) of which is equal to a sum of a symbol a(n) to be emitted and of a corrective factor equal to a transformation Tf applied to a plurality of differences (a(n)-a(n-1)) between two consecutive symbols to be emitted, the transformation Tf applied being a weighted sum of at least two differences between two consecutive symbols of the sequence to be emitted, transformed by an application of a non-linear function f;
    filtering the sequence of transformed symbols b(n) with a shaping filter; and
    modulating the sequence of filtered symbols with a phase modulator in order to obtain a sequence of modulated symbols,
    said transformation Tf being defined so as to minimize interference between modulated symbols filtered by a receiving filter.

2. The continuous phase modulation method of claim 1, in which said transformation Tf is defined by applying the following iterative steps:
    generating a test sequence of digital data symbols;
    filtering the test sequence with a shaping filter to obtain filtered symbols;
    modulating the sequence of filtered symbols filtered by the shaping filter;
    filtering the sequence of modulated symbols with a receiving filter;
    demodulating the sequence of filtered symbols filtered by the receiving filter on reception;
    modifying a value of each symbol a(n) of the test sequence by a preset value so as to obtain a transformed test symbol b(n);
    stopping the iterative process when an error between each demodulated symbol and the corresponding symbol in the test sequence has converged to a minimum value; and
    determining coefficients c of the weighted sum and the non-linear function f of the transformation Tf as those that allow the transformed test sequence to be substantially identical to the test sequence generated then transformed by applying said transformation Tf.

3. The continuous phase modulation method as of claim 2, in which said iterative steps furthermore comprise a step of determining the error between each demodulated symbol and the corresponding symbol in the sequence to be emitted, the value of each symbol a(n) of the test sequence being corrected by a value dependent on said error.

4. The continuous phase modulation method of claim 2, in which said iterative steps are executed for a plurality of different test sequences and the coefficients c of the weighted sum and the non-linear function f are identified using a plurality of test sequence and transformed test sequence pairs.

5. The continuous phase modulation method of claim 2, in which the coefficients c of the weighted sum and the non-linear function f of the transformation Tf are determined by applying the following successive steps:
limiting the coefficients c of the weighted sum to two coefficients of equal value;
determining the non-linear function f and the coefficients c of the weighted sum to be applied so that the transformed test sequence is substantially identical to the test sequence generated then transformed by applying said transformation Tf;
setting the non-linear function f and extending the number of coefficients of the weighted sum; and
determining the coefficients c of the weighted sum to be applied so that the transformed test sequence is substantially identical to the test sequence generated then transformed by applying said transformation Tf.

6. The continuous phase modulation method of claim 2, in which the coefficients c of the weighted sum and the non-linear function f of the transformation Tf are determined using a numerical solution method of a Monte-Carlo type.

7. The continuous phase modulation method of claim 1, in which the non-linear function f is chosen to be an odd function.

8. The continuous phase modulation method of claim 1, in which possible values of the transformed symbols b(n) are calculated from possible values of the symbols a(n) to be emitted and from the coefficients c of the weighted sum and from the non-linear function f.

9. The continuous phase modulation method of claim 1, in which the symbols a(n) to be emitted are taken from a constellation comprising a plurality of states.

10. A method for generating a mathematical transformation Tf intended to be used in a continuous phase modulation method, said method for generating a transformation comprising the following iterative steps:
generating a test sequence of digital data symbols;
filtering the test sequence with a shaping filter to obtain filtered symbols;
modulating the sequence of filtered symbols filtered by the shaping filter;
filtering the sequence of modulated symbols with a receiving filter;
demodulating the sequence of filtered symbols filtered by the receiving filter on reception;
modifying the value of each symbol a(n) of the test sequence by a preset value so as to obtain a transformed test symbol b(n);
stopping the iterative process when an error between each demodulated symbol and a corresponding symbol in the test sequence has converged to a minimum value; and
determining coefficients c of the weighted sum and the non-linear function f of the transformation Tf as those that allow the transformed test sequence to be substantially identical to the test sequence generated then transformed by applying said transformation Tf.

11. An emitter intended to emit a continuous phase modulated signal, comprising:
a receiver configured to receive a sequence of digital data symbols a(n) to be emitted;
computer logic configured to transform the sequence of symbols a(n) to be emitted into a transformed sequence of symbols b(n), each symbol b(n) of which is equal to a sum of a symbol a(n) to be emitted and a corrective factor equal to a transformation Tf applied to a plurality of differences (a(n)-a(n-1)) between two consecutive symbols to be emitted, the transformation Tf applied being a weighted sum of at least two differences between two consecutive symbols of the sequence to be emitted, transformed by applying a non-linear function f;
a shaping filter for filtering the sequence of transformed symbols b(n); and
a phase modulator for modulating the sequence of filtered symbols,
said transformation Tf being defined so as to minimize interference between the modulated symbols filtered by a receiving filter.

12. The emitter of claim 11 in which said transformation Tf is defined by generating a mathematical transformation Tf intended to be used in a continuous phase modulation method, said generating a transformation comprising the following iterative steps:
generating a test sequence of digital data symbols;
filtering the test sequence with a shaping filter to obtain filtered symbols;
modulating the sequence of filtered symbols filtered by the shaping filter;
filtering the sequence of modulated symbols with a receiving filter;
demodulating the sequence of filtered symbols filtered by the receiving filter on reception;
modifying a value of each symbol a(n) of the test sequence by a preset value so as to obtain a transformed test symbol b(n);
stopping the iterative process when an error between each demodulated symbol and the corresponding symbol in the test sequence has converged to a minimum value; and
determining the coefficients c of the weighted sum and the non-linear function f of the transformation Tf as those that allow the transformed test sequence to be substantially identical to the test sequence generated then transformed by applying said transformation Tf.

* * * * *